United States Patent
Bae et al.

(10) Patent No.: US 7,440,977 B2
(45) Date of Patent: Oct. 21, 2008

(54) RECOVERY METHOD USING EXTENDIBLE HASHING-BASED CLUSTER LOGS IN SHARED-NOTHING SPATIAL DATABASE CLUSTER

(75) Inventors: Hae-Young Bae, Incheon (KR); Jae-Dong Lee, Seoul (KR); Young-Hwan Oh, Cheon-An (KR); Gyoung-Bae Kim, Cheong-Ju (KR); Myoung-Keun Kim, Incheon (KR); Soon-Young Park, Incheon (KR); Ho-Seok Kim, Bucheon (KR); Yong-Il Jang, Bucheon (KR)

(73) Assignee: Inha-Industry Partnership Institute, Inchon (KR)

( * ) Notice: Subject to any disclaimer, the term of this patent is extended or adjusted under 35 U.S.C. 154(b) by 295 days.

(21) Appl. No.: 11/157,885

(22) Filed: Jun. 20, 2005

(65) Prior Publication Data
US 2006/0259525 A1    Nov. 16, 2006

(30) Foreign Application Priority Data
May 11, 2005   (KR) .................. 10-2005-0039319

(51) Int. Cl.
*G06F 17/30* (2006.01)
(52) U.S. Cl. .................................. 707/202; 707/1
(58) Field of Classification Search ............... 707/202, 707/200, 1, 2, 205; 714/2, 12–15, 100
See application file for complete search history.

(56) References Cited

U.S. PATENT DOCUMENTS

| | | | |
|---|---|---|---|
| 6,052,785 A * | 4/2000 | Lin et al. | 726/5 |
| 6,546,403 B1 * | 4/2003 | Carlson et al. | 707/202 |
| 7,155,466 B2 * | 12/2006 | Rodriguez et al. | 707/205 |
| 2005/0187891 A1 * | 8/2005 | Johnson et al. | 707/1 |

OTHER PUBLICATIONS

Byung Sup Yoo, Inha- Univ. Engineering Master's Thesis, 2004.
KR 10-2003-0063344 Sep. 9, 2003.
Chung Ho Lee, Inha- Univ. Doctor's Thesis, 2003.

* cited by examiner

*Primary Examiner*—Don Wong
*Assistant Examiner*—Marc R Filipczyk
(74) *Attorney, Agent, or Firm*—Bachman & LaPointe, P.C.

(57) ABSTRACT

The present invention provides a recovery method using extendible hashing-based cluster logs in a shared-nothing spatial database cluster, which eliminates the duplication of cluster logs required for cluster recovery in a shared-nothing database cluster, so that recovery time is decreased, thus allowing the shared-nothing spatial database cluster system to continuously provide stable service. In the recovery method, if a failure occurs in a predetermined node, a second node in a group, including the node, records cluster logs in main memory on the basis of extendible hashing. If the node that has failed recovers itself using a local log, the second node in the group transmits cluster logs in packets to a recovery node that is the failed node. If the recovery node reflects the received cluster logs and maintains consistency with other nodes in the group, the recovery node resumes normal service.

13 Claims, 19 Drawing Sheets

Figure 6a

| OPERATION | CLUSTER LOG | |
|---|---|---|
| INSERT | I | RID |

Figure 6b

| OPERATION | CLUSTER LOG | | |
|---|---|---|---|
| UPDATE | U | RID | old PK |

Figure 6c

| OPERATION | CLUSTER LOG | |
|---|---|---|
| DELETE | D | PK |

|  | PREVIOUSLY RECORDED CLUSTER | | | |
|---|---|---|---|---|
| NEW LOG | – | INSERT LOG | UPDATE LOG | DELETE LOG |
| INSERT LOG | INSERT LOG | X | X | ※ |
| UPDATE LOG | UPDATE LOG | INSERT LOG | UPDATE LOG | X |
| DELETE LOG | DELETE LOG | DELETE LOG | DELETE LOG | X |

Figure 10a

| RECORDED LOG | TRANSMISSION INFORMATION | |
|---|---|---|
| INSERT | I | Data |

Figure 10b

| RECORDED LOG | TRANSMISSION INFORMATION | | |
|---|---|---|---|
| UPDATE | U | Data | old PK |

Figure 10c

| RECORDED LOG | TRANSMISSION INFORMATION | |
|---|---|---|
| DELETE | D | PK |

RECOVERY METHOD USING EXTENDIBLE HASHING-BASED CLUSTER LOGS IN SHARED-NOTHING SPATIAL DATABASE CLUSTER

BACKGROUND OF THE INVENTION

1. Field of the Invention

The present invention relates, in general, to a shared-nothing spatial database cluster system and, more particularly, to a recovery method using extendible hashing-based cluster logs in a shared-nothing spatial database cluster, which eliminates the duplication of cluster logs required for cluster recovery in a shared-nothing database cluster, so that recovery time is decreased, thus allowing the shared-nothing spatial database cluster system to continuously provide stable service.

2. Description of the Related Art

A database cluster is a database in which nodes independently capable of providing services are connected to each other through a high speed network and act as a single system. The database cluster provides a division policy, so that a piece of data is divided into small pieces of data and the small pieces of data are managed by different nodes, thus providing high performance to improve simultaneous throughput with respect to an update operation. Further, the database cluster provides a replication policy, so that the duplicates of respective data remain in other nodes, thus providing availability to continuously provide service even if a failure occurs in one node. Further, the database cluster provides idle nodes, so that, if the number of users rapidly increases and a load increases, the idle nodes are used for online extension, thus providing high extensibility to accommodate users who rapidly increase in number.

Such a database cluster includes a shared memory scheme, a shared disk scheme and a shared-nothing scheme, which are shown in FIGS. 1a to 1c.

The shared memory scheme of FIG. 1a denotes a structure in which all nodes have independent processes and perform operations and can directly access global shared memory and disks. This shared memory scheme is disadvantageous in that a network load excessively increases in order to access the shared memory and in that all processes use the shared memory, so that the disturbance of access to shared resources is increased. Therefore, each node must independently set the size of its cache memory to the maximum.

The shared disk scheme of FIG. 1b denotes a structure in which all nodes include respective processors and memory devices and directly access shared disks to process transactions. This scheme is disadvantageous in that, since all nodes share disks, lock frequently occurs with respect to desired resources, and update operations must be equally performed on all disks. Therefore, as the number of disks increases, the load of update operations increases.

The shared-nothing scheme of FIG. 1c denotes a structure in which respective nodes are implemented as independent systems and separately include their own memory devices and disks. This scheme is advantageous in that, since the dependence of each node on resources is minimized and each node is not influenced by other nodes at the time of processing transactions, extension is easily performed and parallelism for complicated query processing is excellent. Therefore, it is preferable that the database cluster use the shared-nothing scheme that can be easily extended and has excellent parallelism.

In the shared-nothing database cluster, a recovery technique is considered to be very important for high availability. For an effective recovery technique, attempts to reduce a transmission load at the time of transmitting cluster logs, maintained for consistency between nodes, to a recovery node, and to reduce the recovery time of the recovery node, have been made.

Generally, the recovery of the shared-nothing database cluster includes a node recovery procedure of recovering an individual node and a cluster recovery procedure of recovering cluster configuration.

Node recovery is a recovery procedure of maintaining the consistency of data belonging to a node up to the time when a failure occurs in the node. Cluster recovery is a recovery procedure of maintaining the consistency of data from the time at which the node recovery terminates to the time at which the data participate in the configuration of a cluster when a failure occurs in the node.

If a failure occurs in a node, node recovery is performed to maintain the consistency of the node itself. Thereafter, the recovery of cluster configuration is performed, so that the consistency of operations processed after the failure occurred is maintained. The recovery of cluster configuration is completed, so that the failed node resumes normal service with respect to all operations.

Typical database cluster recovery techniques include the recovery technique of ClustRa, the recovery technique of Replication Server, the recovery technique of Group Membership Services (GMS)/Cluster, etc.

FIG. 2 illustrates the system configuration of ClustRa. ClustRa is a main memory-based database cluster, which provides a service of configuring a cluster using non-spatial data. ClustRa has a structure in which nodes independently capable of processing queries are connected to each other through a high speed network, and a master node and a backup node form a single group and maintain the same data duplicate.

ClustRa divides a single piece of data into small pieces of data using a division policy applied between groups, and respective groups independently maintain the small pieces of data, thus increasing simultaneous throughput. Further, ClustRa maintains the same data duplicate in respective groups using a replication policy applied to groups, so that a group having the duplicate can continuously provide service when a failure occurs in another node. However, if a single duplicate exists and a failure occurs in two groups in the worst case, service cannot be provided. Therefore, the rapid recovery of the failed node heavily influences the continuous provision of service.

If a failure occurs in a node, ClustRa performs a recovery procedure using an internal log required to recover the node itself and distribution logs required to recover cluster configuration. The distribution logs are generated to propagate duplicates in a typical query process and must be stored in a stable storage device. The synchronization of distribution logs is controlled in the duplicates by means of the sequence of logs.

A ClustRa node periodically transmits a message "I am alive" to another node in the same group to detect a stoppage, and waits for a response. If a response is not returned in a certain period of time, it is determined that a failure has occurred in the other node. After the failed node completes recovery of itself using an internal log, the node performs cluster recovery by sequentially receiving distribution logs. However, the recovery technique of ClustRa has the following problem. That is, since node-based distribution logs are maintained in a single queue, the maintenance load for distribution logs is increased, and since the distribution logs are sequentially transmitted to a recovery node, recovery time is increased.

Next, Replication Server is a system in which nodes independently capable of processing queries are bundled and constructed as a single server, and which provides only data replication policy without providing data division policy. This Replication Server is constructed using two or more nodes to provide a complete replication technique, thus improving simultaneous throughput. Further, if only a single node is available and two or more nodes are stopped, continuous service can be provided. The system construction of the Replication Server is shown in FIG. 3.

If an arbitrary node is stopped in Replication Server, service is continuously provided by other nodes. If the stopped node is recovered, a transaction system is first recovered, and then cluster configuration is recovered by a replication management system.

At this time, a recovery node sends other nodes a message, indicating that the node has recovered, together with a last log number of the replication management system processed by the recovery node. The nodes, having received the message, select a single node to help the recovery node configure the replication of the recovery node. The selected recovery management node sequentially transmits logs starting from a log subsequent to the log number received from the recovery node, among the logs included in the replication management system belonging to the recovery management node, to all nodes through a group transmission system. The recovery node receives the logs to perform recovery, and can normally process queries after all recovery procedures have been completed.

As such, the Replication Server has the following problems. That is, even backup tables as well as master tables leave logs with respect to all tables of each node, thus increasing log maintenance cost. Further, since database-based logs are maintained, normal service can be provided only after all databases have recovered, thus increasing recovery time.

Meanwhile, GMS/Cluster is a system which has nodes independently capable of processing queries in a shared-nothing structure, and in which 2 to 4 nodes are bundled into a group. The GMS/Cluster uses a complete replication technique allowing all nodes in a group to maintain the same data, so that simultaneous throughput for a search operation is increased. Further, the GMS/Cluster provides availability to continuously provide service even if a failure occurs in one node. The GMS/Cluster provides division policy between groups, thus increasing simultaneous throughput for an update operation and efficiently managing large capacity data. An idle node is a node that does not process queries, and is used for online extension.

However, if a failure occurs in one node, the overall load of processing queries increases. Therefore, rapid recovery is important in order to provide stable service.

FIG. 4 is a system configuration view of the GMS/Cluster. The GMS/Cluster system is implemented so that nodes are connected to each other through a high speed network, and immediately sense a failure when the failure occurs in one node. If a failure occurs in a node, the GMS/Cluster system performs a recovery procedure using a local log required to recover that node and cluster logs required to recover cluster configuration. The local log is equal to a conventional single database log, which must exist in all nodes. The cluster logs are implemented to independently record table-based cluster logs in a master table. If the failed node completes recovery of itself, the node requests cluster logs from other nodes in the group and performs a recovery procedure on the basis of the cluster logs.

However, the GMS/Cluster system is problematic in that, since a plurality of pieces of update information are maintained in cluster logs with respect to a single record if a plurality of operations occurs with respect to the single record, the size of the cluster logs increases and transmission cost increases, and since a recovery node repeatedly performs operations several times with respect to a single record, recovery time increases.

SUMMARY OF THE INVENTION

Accordingly, the present invention has been made keeping in mind the above problems occurring in the prior art, and an object of the present invention is to provide a recovery method using extendible hashing-based cluster logs in a shared-nothing spatial database cluster, which maintains only the latest update information using extendible hashing, so that the number of cluster logs required for recovery is reduced, thus shortening the recovery time of a recovery node and decreasing a load caused by the occurrence of node failure.

Another object of the present invention is to provide a recovery method using extendible hashing-based cluster logs in a shared-nothing spatial database cluster, which maintains cluster logs in main memory, thus decreasing the maintenance load for cluster logs.

In order to accomplish the above objects, the present invention provides a recovery method using extendible hashing-based cluster logs in a shared-nothing spatial database cluster, comprising the steps of, if a failure occurs in a predetermined node, a second node in a group, including the node, recording cluster logs in main memory on the basis of extendible hashing; if the node that has failed recovers itself using a local log, the second node in the group transmitting cluster logs in packets to a recovery node that is the failed node; and if the recovery node reflects the received cluster logs and maintains consistency with other nodes in the group, the recovery node resuming normal service.

Preferably, the cluster logs may be configured using update information of a record and Record ID (RID) or primary key information, which is a pointer indicating actual data stored in a database. Further, the cluster logs may be implemented so that, if a plurality of operations occurs with respect to a single record after failure has occurred in the node, only latest update information is maintained in the cluster logs using extendible hashing. If an insert or update operation occurs with respect to the record, cluster logs may be configured on the basis of the RID indicating a physical address of data. If a delete operation occurs, cluster logs may be configured on the basis of a primary key to identify data.

Preferably, the transmission of cluster logs may comprise the steps of initializing packets; sequentially accessing the cluster logs that maintain the latest update information and are stored in the buckets of the main memory, using a connection list, duplicating actual data in the packets on the basis of RID stored in the cluster logs, and then transmitting the cluster logs to the recovery node; and performing synchronization to maintain consistency between nodes if all cluster logs have been transmitted.

Preferably, the transmission of the cluster logs to the recovery node may be sequentially performed with respect to the cluster logs ranging from a cluster log in a first bucket in the main memory to a cluster log in a last bucket. Further, the transmission of the cluster logs to the recovery node may be performed so that, if a transaction occurs during the transmission of the cluster logs and cluster logs remain, a processing position moves to a first bucket and the remaining cluster logs are transmitted to the recovery node after a cluster log in the last bucket has been completely transmitted. Further, the transmission of the cluster logs may be performed so that, if a transaction occurs during the transmission of the cluster logs and the number of cluster logs is not decreased, but is maintained at a certain number, a synchronization procedure is compulsorily performed.

BRIEF DESCRIPTION OF THE DRAWINGS

FIGS. 6a to 6c are views showing the configuration of the cluster log of FIG. 5;

FIGS. 10a to 10c are views showing cluster log transmission information according to the present invention;

DESCRIPTION OF THE PREFERRED EMBODIMENTS

Hereinafter, embodiments of the present invention will be described in detail with reference to the attached drawings. The following embodiments are only illustrative examples of the present invention, and the present invention is not limited to the following embodiments.

In the present invention, cluster logs are required to recover cluster configuration in a database cluster and are generated separately from local logs required to recover individual nodes. If a failure occurs in a node, other nodes in a group generate cluster logs. Each node independently records cluster logs in a master table corresponding to the node.

Further, a duplicate table of another node having a duplicate of a master table existing in the failed node is selected as a temporary master table. The temporary master table functions as a master table until the failed node completes recovery. A recovery node denotes a node that has failed, receives cluster logs from other nodes in the group and performs a recovery procedure.

Cluster logs are recorded in main memory on the basis of extendible hashing, and are each composed of the update information of a record and a pointer indicating actual data, that is, a Record ID (RID) or primary key information which is one of fields having unique values for each record in the table. If a plurality of operations occurs with respect to a single record after a failure occurs in a node, only the latest update information is maintained in cluster logs using extendible hashing. If an insert operation and an update operation occur, cluster logs are configured on the basis of RID indicating the physical address of data. If a delete operation occurs, cluster logs are configured on the basis of a primary key to identify data. Therefore, the size of maintained cluster logs and information stored therein vary according to the type of operations that occurred.

Figure 1A:
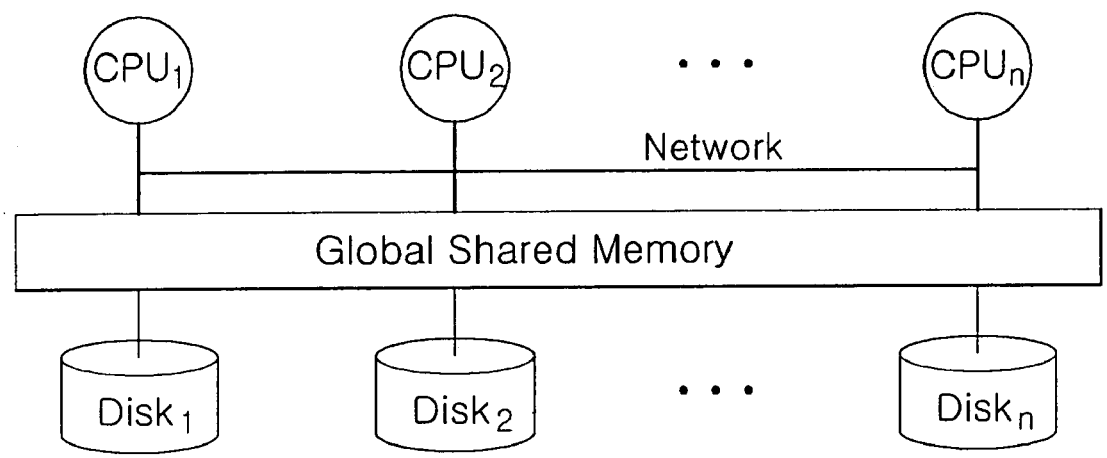
FIGS. 1a to 1c are views showing the configuration of typical database clusters.
Figure 1B:
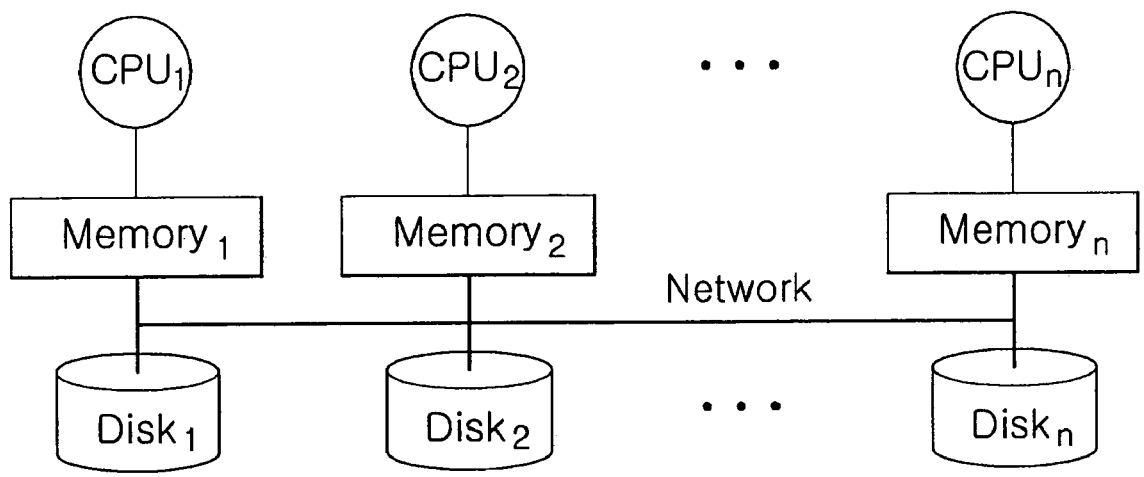
Figure 1C:
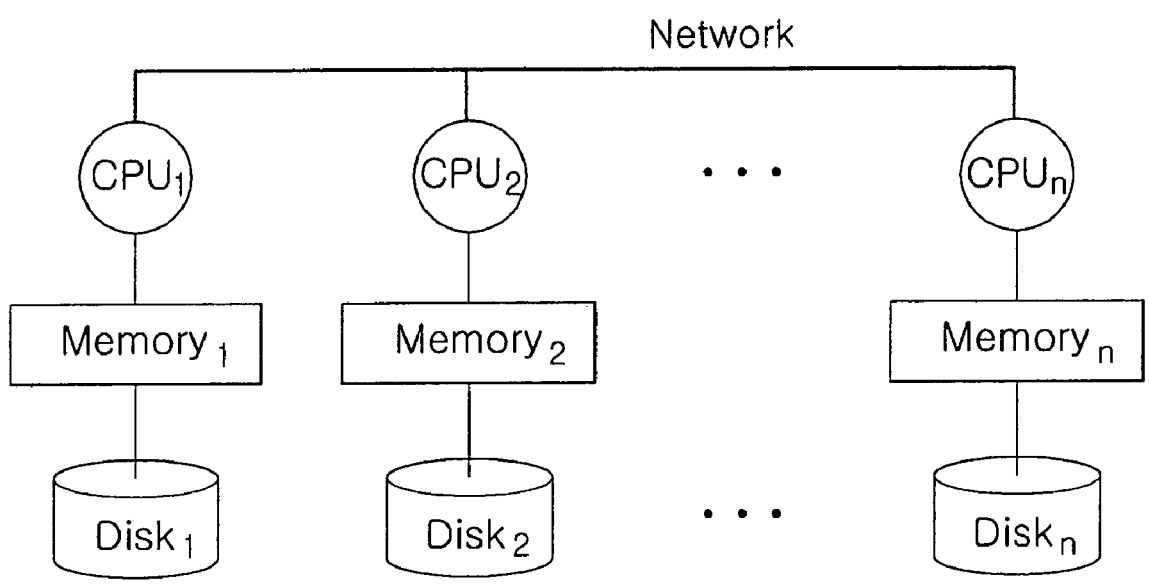
Figure 2:
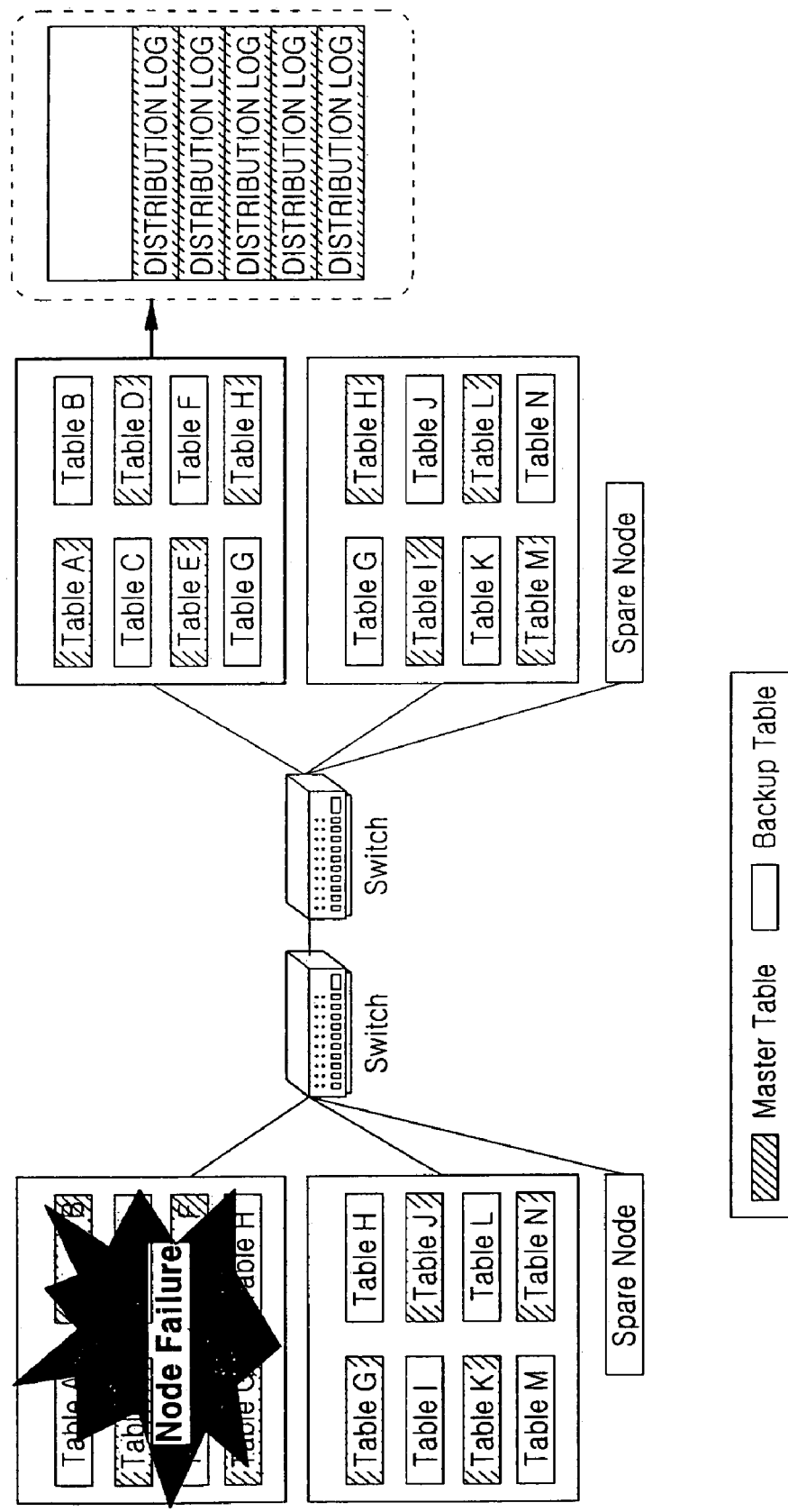
FIG. 2 is a system configuration view of ClustRa showing implementation of the recovery technique thereof.
Figure 3:
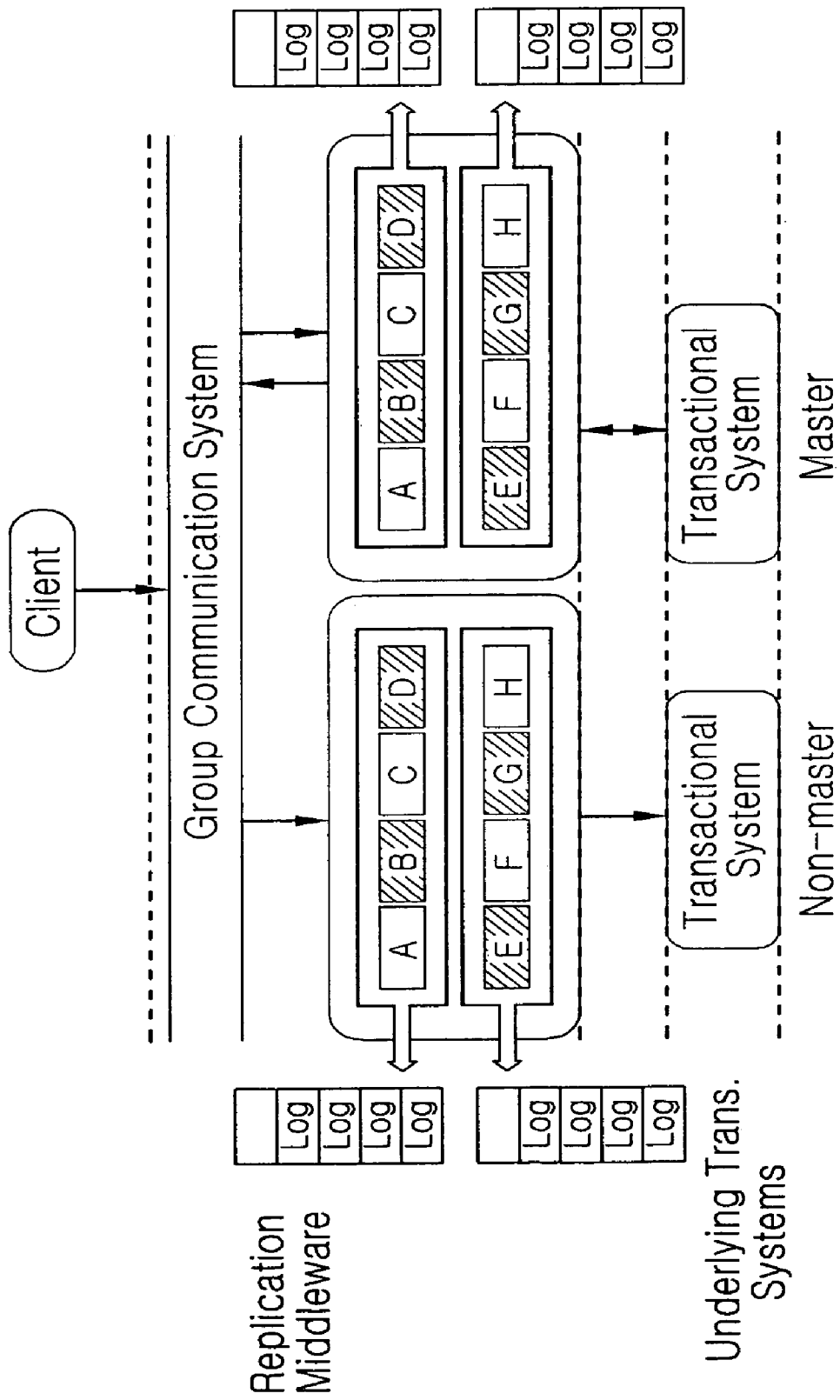
FIG. 3 is a system configuration view of a Replication Server showing implementation of the recovery technique thereof.
Figure 4:
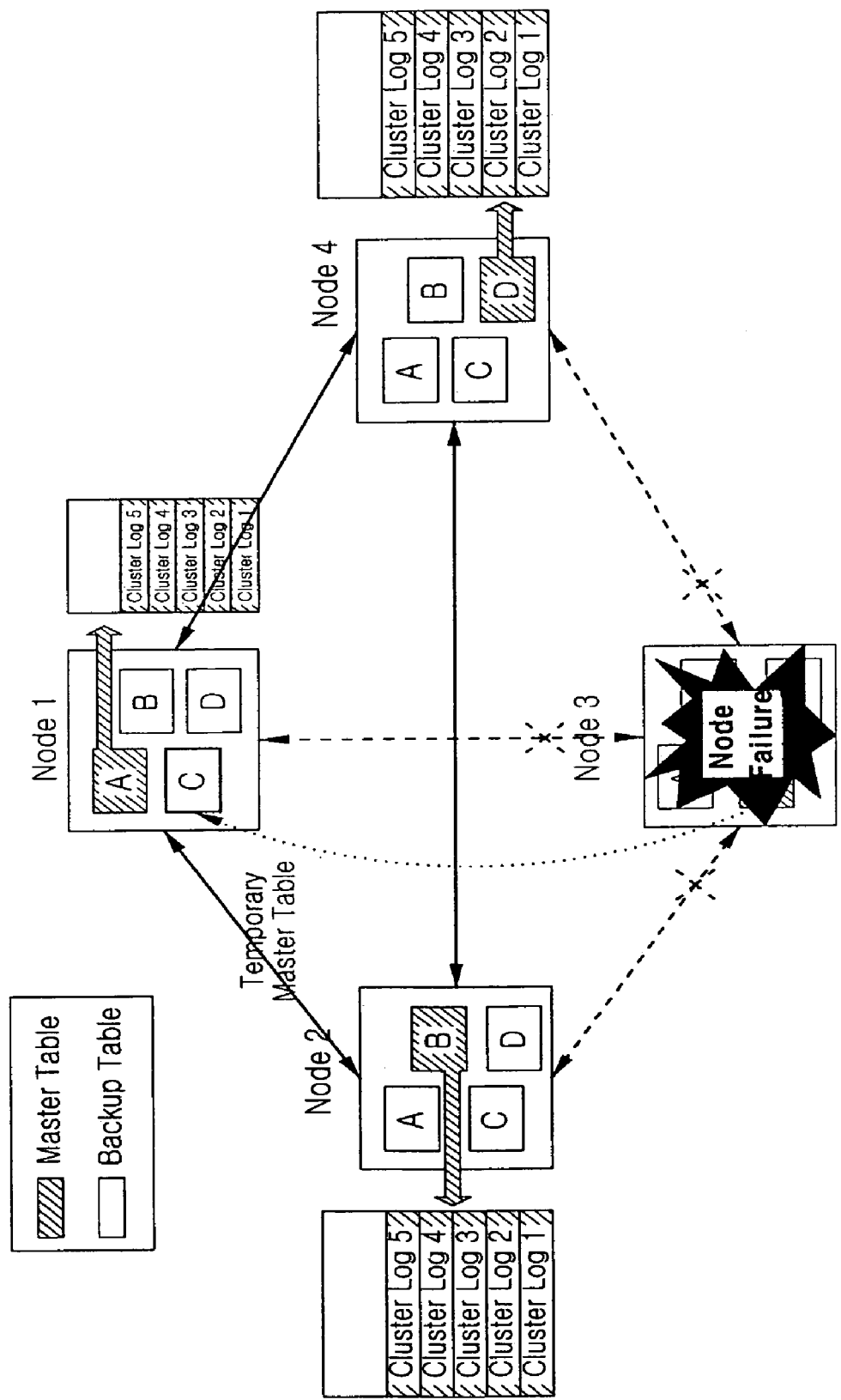
FIG. 4 is a system configuration view of GMS/Cluster showing implementation of the recovery technique thereof.
Figure 5:
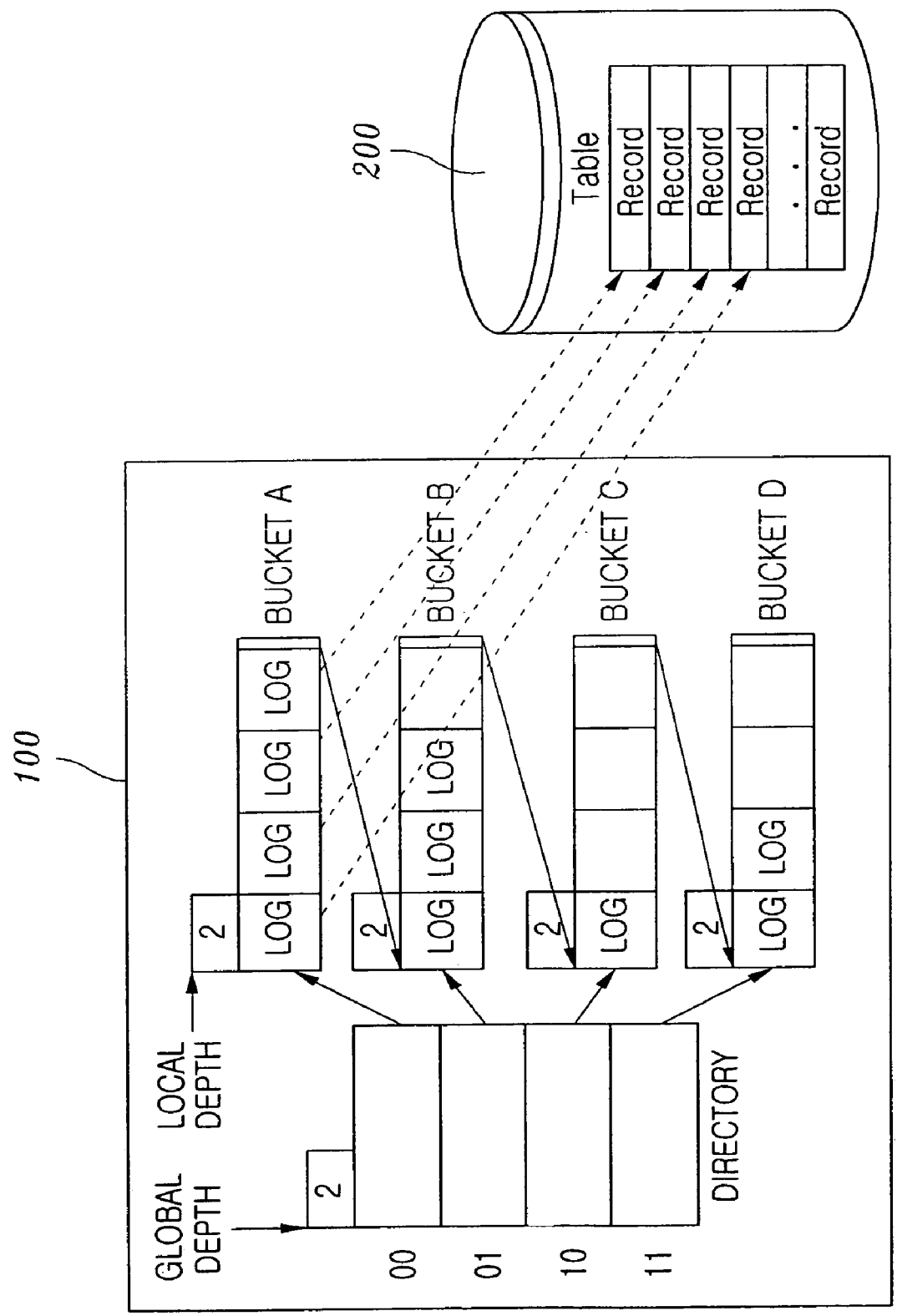
FIG. 5 is a view showing an extendible hashing-based cluster log management structure according to the present invention.

FIG. 5 is a view showing an extendible hashing-based cluster log management structure according to the present invention, in which the structure of cluster log management by main memory 100 is shown.

Data required to manage cluster logs maintained in the main memory 100 are composed of a global depth, a local depth, a directory and buckets. Information about each element is described below.

A global depth is an index for a directory which denotes the size of a current directory, and a local depth denotes the occurrence of overflow from a corresponding bucket. A directory stores a pointer indicating buckets. Each bucket stores cluster logs (logs of FIG. 5) maintaining the latest update information. Each bucket supports combination and division according to a cluster log, and the directory supports only division, so that a structure of decreasing operation cost in the main memory 100 is implemented.

Further, each bucket sequentially accesses cluster logs in a connection list structure to flexibly configure packets at the time of transmitting the cluster logs to a recovery node. Each of cluster logs stored using extendible hashing is composed of the update information of a record and information indicating actual data stored in a database 200. The database 200 maintains actual data on which an operation occurs.

If an insert operation and an update operation occur, cluster logs are configured on the basis of RID indicating the physical address of data. If a delete operation occurs, cluster logs are configured on the basis of a primary key to identify data.

When a failure occurs in a node, cluster logs start to be recorded in another node in the group to maintain consistency. The other node in the group maintains the latest update information and a pointer indicating actual data, that is, RID or primary key information according to operation, in the cluster logs on the basis of extendible hashing in the main memory 100.

FIGS. 6a to 6c are views showing the configuration of the cluster log of FIG. 5.

If an insert operation occurs, data are inserted in a master table and an index is generated on the basis of RID of the data to be inserted. Further, an I flag indicating that the insert operation has occurred, and an RID which is the physical address of actual data stored in the database 200 remain in a cluster log (refer to FIG. 6a).

If an update operation occurs, data are updated in the master table and an index is updated on the basis of RID of the data to be updated. Further, a U flag indicating that the update operation has occurred, an RID which is the physical address of actual data stored in the database 200, and a primary key of old data (old Primary Key: PK) which is to be updated, remain in a cluster log (refer to FIG. 6b).

If a delete operation occurs, data are deleted from the master table, and an index is updated on the basis of a primary key of data to be deleted. Further, a D flag indicating that the delete operation has occurred, and a primary key (PK) of data to be deleted remain in a cluster log (refer to FIG. 6c).

Therefore, only the updated information of a record and a pointer indicating actual data are stored, so that the size of cluster logs is decreased, and the maintenance load for the cluster logs is decreased.

The recording of cluster logs is performed so that a directory address is searched for using results, obtained by applying RID of a corresponding record to a hash function, in binary notation, and the cluster logs are recorded in a bucket indicated by a pointer stored in a directory.

The recording of cluster logs is performed so that a master node independently records logs according to a generated transaction when a failure occurs in a node. Further, if a plurality of operations occurs before cluster logs are reflected on a recovery node, the operations are processed in a corresponding master table, and then the latest update information is reflected in the cluster logs. This operation allows only the latest update information to remain in the cluster logs even if a plurality of operations has occurred, so that the recovery node performs a single operation, thus maintaining consistency with other nodes. Further, this operation causes the size of cluster logs to decrease, thus supporting the rapid recovery of the recovery node.

Figures 7A, 7B:
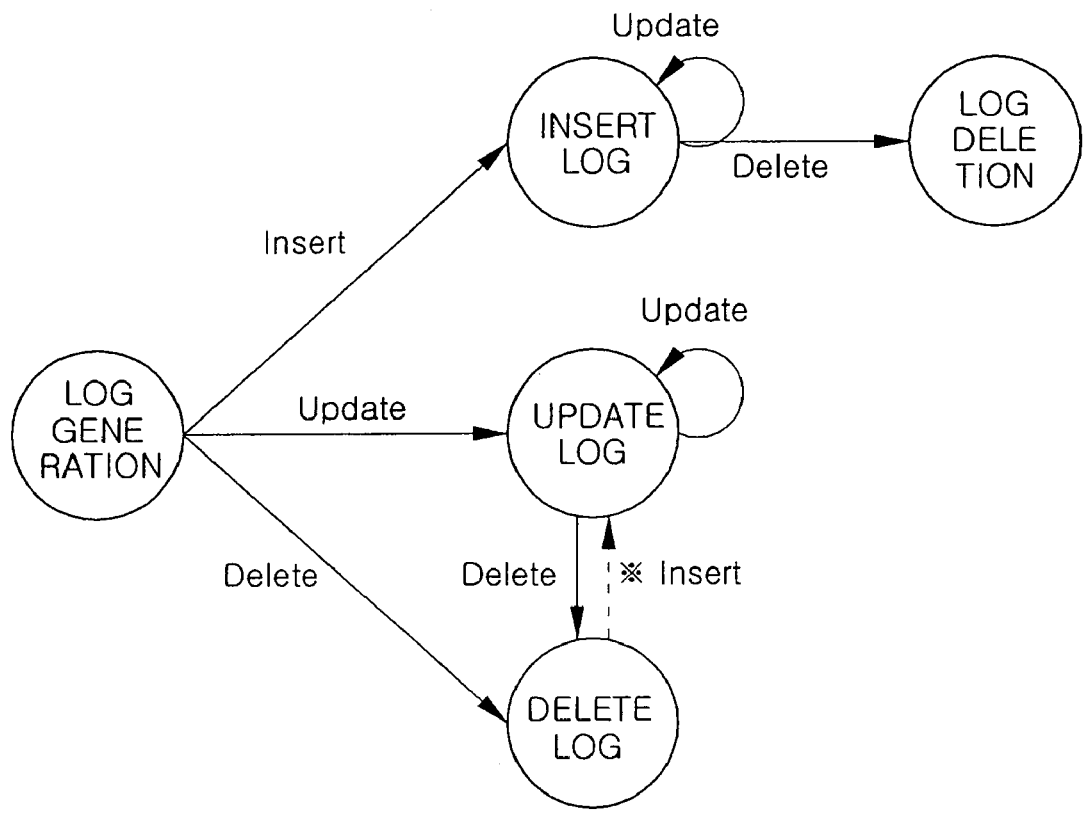
FIGS. 7a and 7b are diagrams showing the recording of cluster logs maintaining the latest update information according to the present invention.

FIGS. 7a and 7b are views showing the recording of cluster logs maintaining the latest update information. FIG. 7a illustrates a process of allowing a cluster log to maintain the latest update information according to operations occurring after the cluster log was generated, and FIG. 7b illustrates that only the latest cluster log is maintained, even if a plurality of operations has occurred to perform a recovery operation. In FIGS. 7a and 7b, "∈" indicates that, when an insert log is generated after a delete log is recorded, primary keys of the delete and insert logs are compared to each other, and an update log or insert log is recorded.

After a cluster log is generated, an insert operation, an update operation and a delete operation can occur. "Start" denotes the generation of the cluster log. If new data are inserted in a master table after the occurrence of a failure, an insert log is recorded to apply the new data to a recovery node. If old data are updated, an update log is recorded to reflect the updated data. If data are deleted, a delete log is recorded. If the recorded log is transmitted to the recovery node and reflected on the recovery node, a corresponding cluster log is deleted. If a plurality of operations occurs before the recorded log is transmitted to the recovery node, the latest update information remains in the cluster log.

If the recovery node requests a rollback for the remaining cluster log, the recovery node requests a rollback operation from a node including the master table. The master table records a cluster log corresponding to the requested rollback operation and transmits the cluster log to the recovery node.

Figure 8:
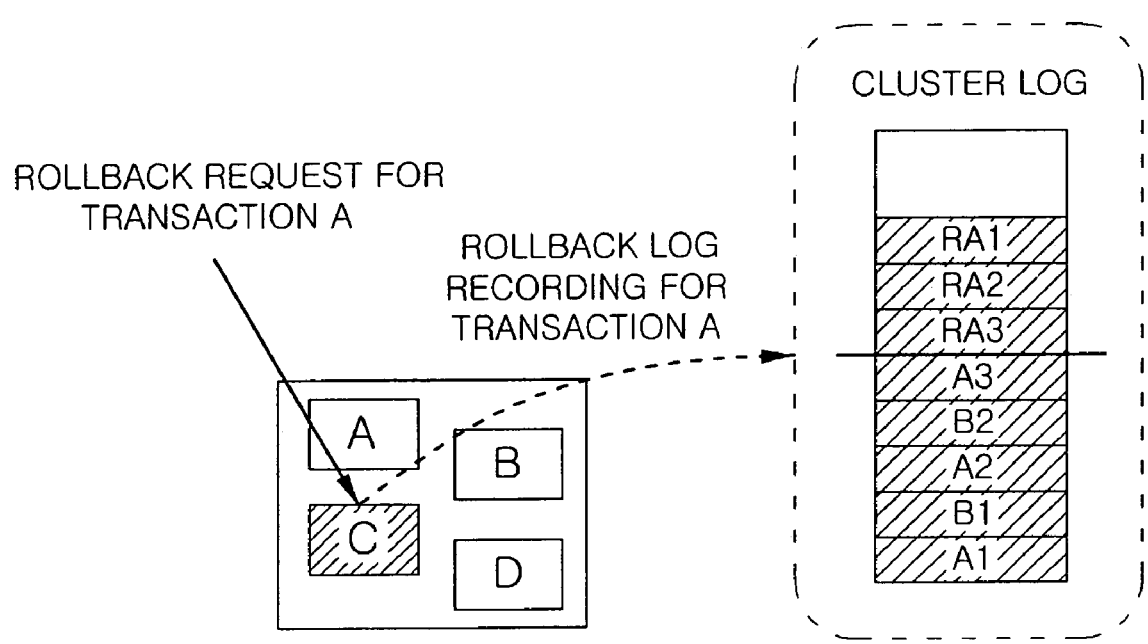
FIG. 8 is a diagram showing the processing of a rollback operation according to the present invention.

FIG. 8 is a diagram showing a process of recording a cluster log when a rollback operation occurs. If a recovery node requests a rollback from a node while the master table of the node records cluster logs, the master table records rollback logs in the reverse order of generated transactions.

The recording of cluster logs that should be noted exists when the latest update information is maintained, and the cluster log recording is described below. If an update operation occurs after an insert operation, the update operation occurs and data are changed before new data are generated in the master table and an insert log is reflected on the recovery node. This operation is performed to record the RID of the updated data in the insert log so as to insert the updated data in the recovery node because the recovery node cannot reflect the new data. If a delete operation occurs after an insert operation, the delete operation occurs before new data are generated in the master table and the insert log is reflected on the recovery node, so that the data do not exist in the master table. Therefore, any log is not reflected on the recovery node.

If an insert operation occurs after a delete operation, an update log is recorded to change data to be deleted to a new value in the case where data having the same primary key as deleted data are inserted in the master table after data have been deleted from the master table. If an insert operation occurs after a delete operation, the RID of new data remain in the insert log because deleted data are separate from data to be inserted. Therefore, even though a plurality of operations occurs using extendible hashing, only the latest update item is recorded in cluster log.

Cluster recovery is performed by receiving cluster logs, so that the transmission of cluster logs greatly influences cluster recovery. Hereinafter, a message format for transmitting cluster logs that maintain the latest update information and are recorded in the master table to a recovery node, a transmission method therefor, and a procedure of causing transmitted cluster logs to be reflected on the recovery node and maintaining consistency, are described.

Cluster logs are transmitted to a failed node over a network, thus increasing a transmission load. Therefore, cluster logs are transmitted in packets to minimize the transmission load, and thus a message format of the cluster logs for that operation is required.

Figure 9:
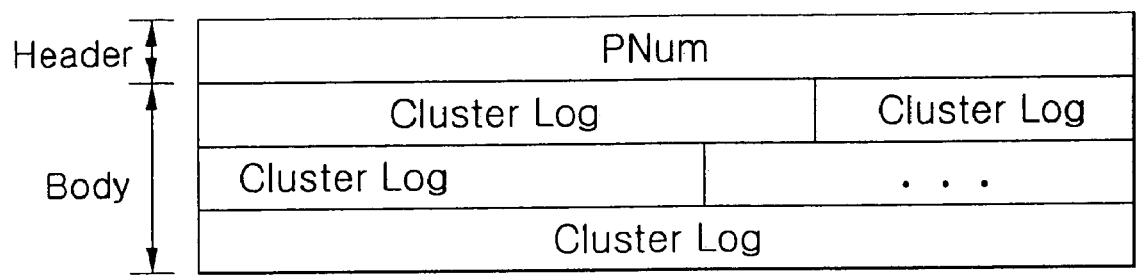
FIG. 9 is a view showing a message format for the transmission of cluster logs according to the present invention.

FIG. 9 is a view showing a message format for the transmission of cluster logs. The transmission message format is composed of a header and a body. The header is a part for indicating a packet number of cluster logs, which ensures the serializability of packets. The body is a part required to transmit actual cluster logs, so that the cluster logs, the number of which corresponds to the size of the packet body, are sequentially duplicated. The cluster logs to be transmitted have varying sizes thereof and varying information therein according to RID or primary key of a recorded cluster log.

FIGS. 10a to 10c are views showing cluster log transmission information according to a cluster log. If an insert log is transmitted as shown in FIG. 10a, an I flag indicating that an insert operation has occurred and actual data to be reflected are stored in a cluster log on the basis of the RID stored in the cluster log. If an update log is transmitted as shown in FIG. 10b, a U flag indicating that an update operation has occurred, actual data to be reflected, and a primary key required to search for old data to be updated, are stored in the cluster log on the basis of the RID stored in the cluster log. If a delete log is transmitted as shown in FIG. 10c, a D flag and a primary key of data to be deleted are stored in a cluster log on the basis of the primary key stored in the cluster log.

In the meantime, a recovery node performs node recovery at the first step. Node recovery uses a local log left when an update operation has occurred on the data of a node. If node recovery is completed, the recovery node maintains the consistency of data thereof, and performs cluster recovery that is the second step required to maintain the consistency of cluster configuration.

At the time of cluster recovery, the recovery node informs other nodes that the recovery node has recovered, and requests recorded cluster logs from the other nodes. The other nodes sense that the recovery node has completed node recovery at the first step, and transmit the cluster logs to the recovery node in packets.

Figure 11:
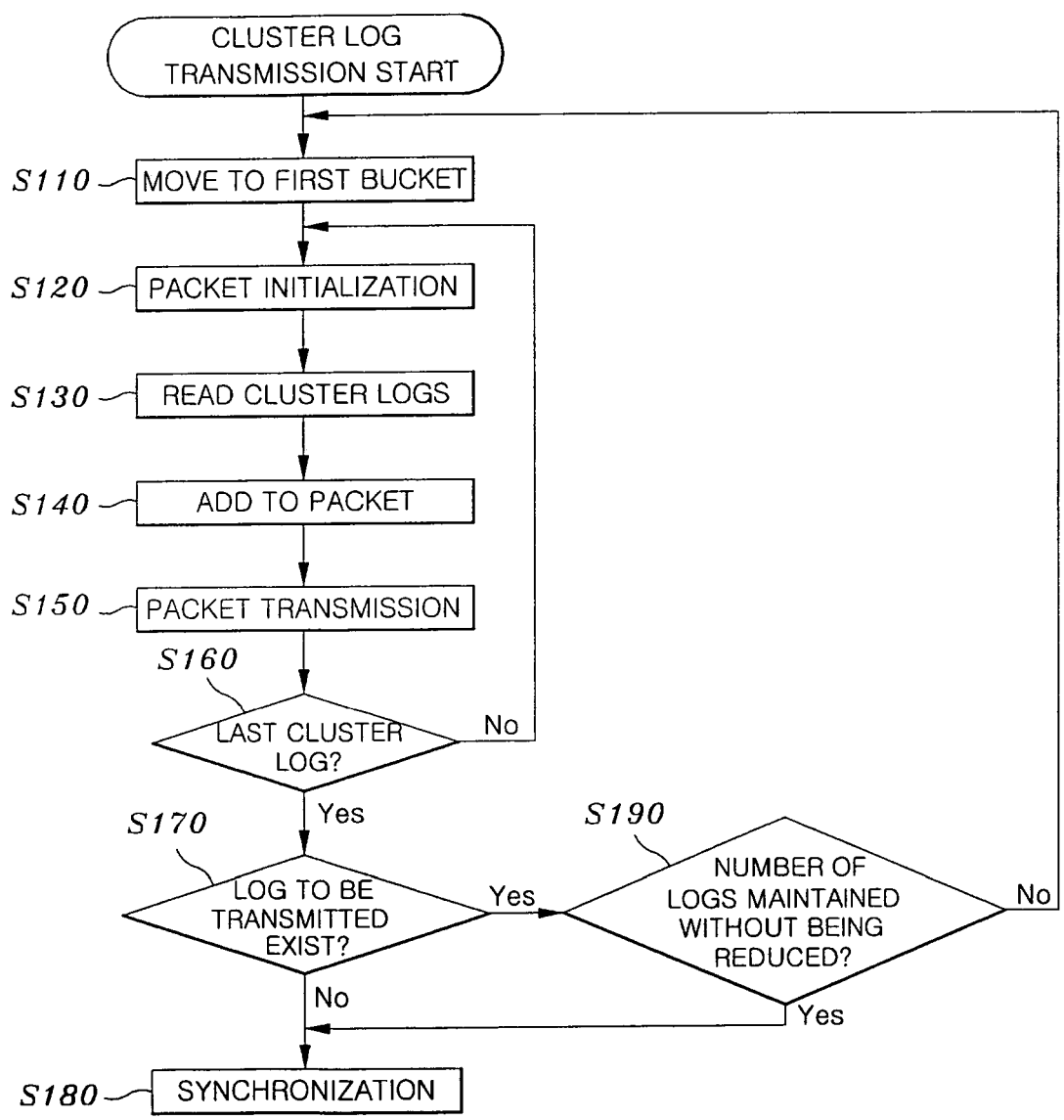
FIG. 11 is a flowchart showing the transmission of cluster logs according to the present invention.

FIG. 11 is a flowchart showing a process of transmitting cluster logs.

A processing position moves to a first bucket to transmit cluster logs at step S110, and a packet is initialized at step S120. Cluster logs that are stored in each bucket and maintain the latest update information are sequentially accessed using a connection list at step S130. Actual data are duplicated in and added to a packet on the basis of RID stored in the cluster logs at step S140. If a single packet is configured, the packet is transmitted to the recovery node at step S150.

An initialization procedure is performed with respect to a packet for which an acknowledgement is received and a bucket is accessed to configure cluster logs as a packet until the last cluster log has been transmitted to the recovery node at step S160. If a transaction occurs during transmission, the transaction is processed by a corresponding master table, so a cluster log remains. Each bucket is examined to determine whether a cluster log to be transmitted exists at step S170. If no cluster log to be transmitted exists, a synchronization procedure is performed at step S180.

If a transaction occurs during the transmission and cluster logs exist at step S170, the processing position returns to the first bucket, and the remaining cluster logs are configured as a packet and transmitted to the recovery node. If cluster logs exist during transmission, but the number of cluster logs is maintained at a certain number without decreasing at step S190, a synchronization procedure is compulsorily performed at step S180.

Cluster logs are logs that remain to maintain the consistency of operations processed after a failure has occurred in a node. That is, the recovery node informs other nodes in the group that the recovery node has recovered after the recovery of the failed node has been completed, and requests the remaining cluster logs from the other nodes. The other nodes in the group configure the remaining cluster logs as a packet, and transmit the packet to the recovery node. The recovery node reads the header of the packet and sequentially reflects the cluster logs. If a failure occurs while the recovery node receives the cluster logs to perform a recovery procedure, the master node immediately senses the occurrence of the failure and retransmits the cluster logs.

If a node, including a master table, performs a synchronization procedure, the master node transmits the last packet to the recovery node. This shows that all cluster logs are reflected on the recovery node after a failure occurs in the node. The master table, having received an acknowledgement, transmits a transaction maintained during the synchronization procedure to the recovery node, thus maintaining consistency with other nodes.

The synchronization procedure is a procedure of consistently maintaining all cluster logs. That is, the master table is changed to a temporary standby state, so that all transactions occurring in the standby state stand by in the queue of the master table. If the last cluster log packet is reflected on the recovery node, the transactions standing by in the queue are transmitted to the recovery node, thus maintaining consistency with other nodes. The recovery node returns to a state existing prior to the occurrence of failure, thus terminating the reflection of cluster logs.

Figure 12:
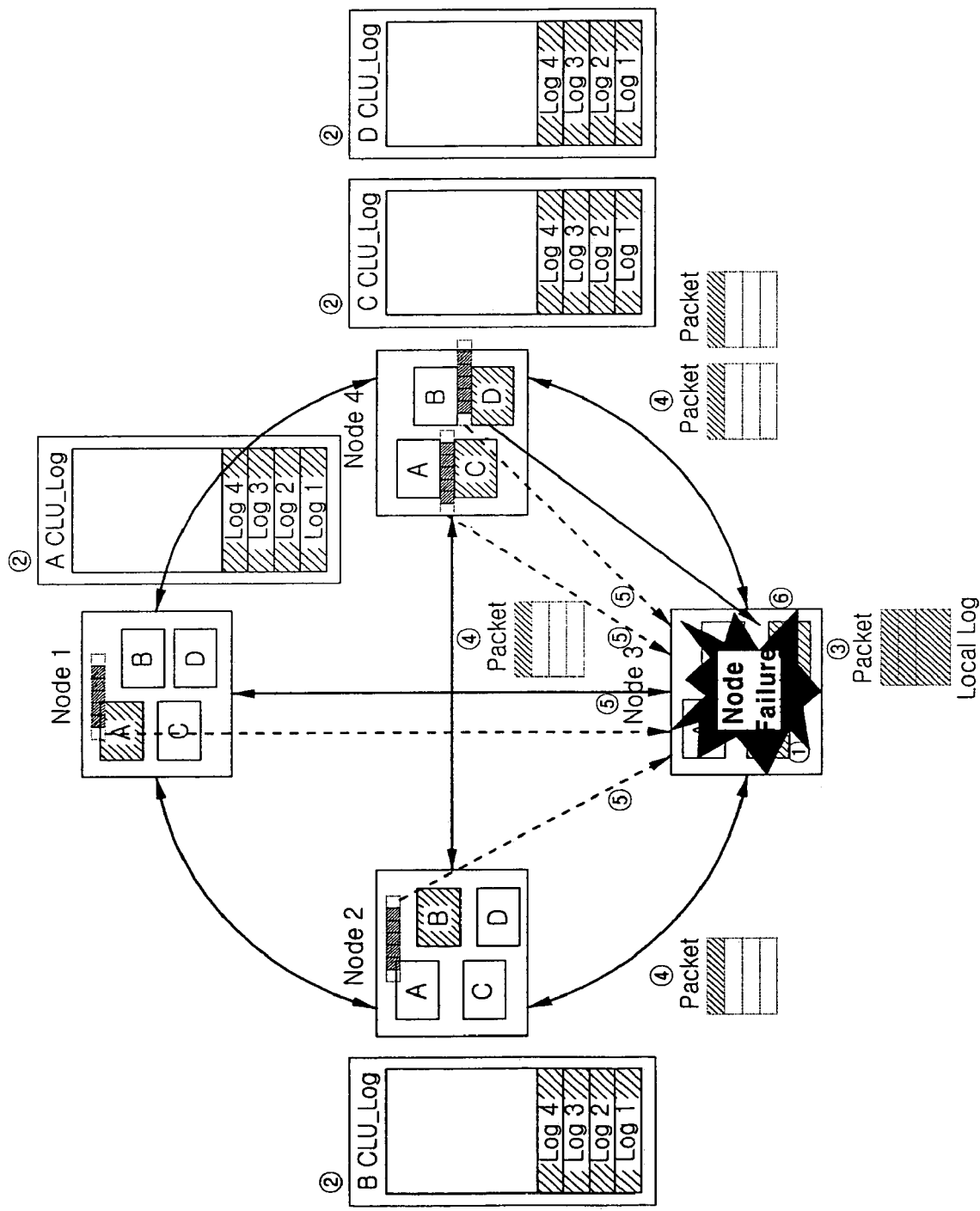
FIG. 12 is a diagram showing a recovery procedure using extendible hashing-based cluster logs according to the present invention.

FIG. 12 is a diagram showing an entire recovery procedure using extendible hashing-based cluster logs.

First, at ①, if a failure occurs in a node, other nodes in the group immediately sense the occurrence of the failure. At ②, the other nodes in the group maintain the latest update information in cluster logs using extendible hashing. At ③, a recovery node performs recovery of itself, thus maintaining the consistency of the data thereof. At ④, the other nodes in the group transmit cluster logs in packets after node recovery has been completed. At ⑤, a synchronization procedure for maintaining the consistency of transactions is performed. At ⑥, the recovery node returns to a state existing prior to the occurrence of the failure, thus resuming normal service.

Figure 13A:
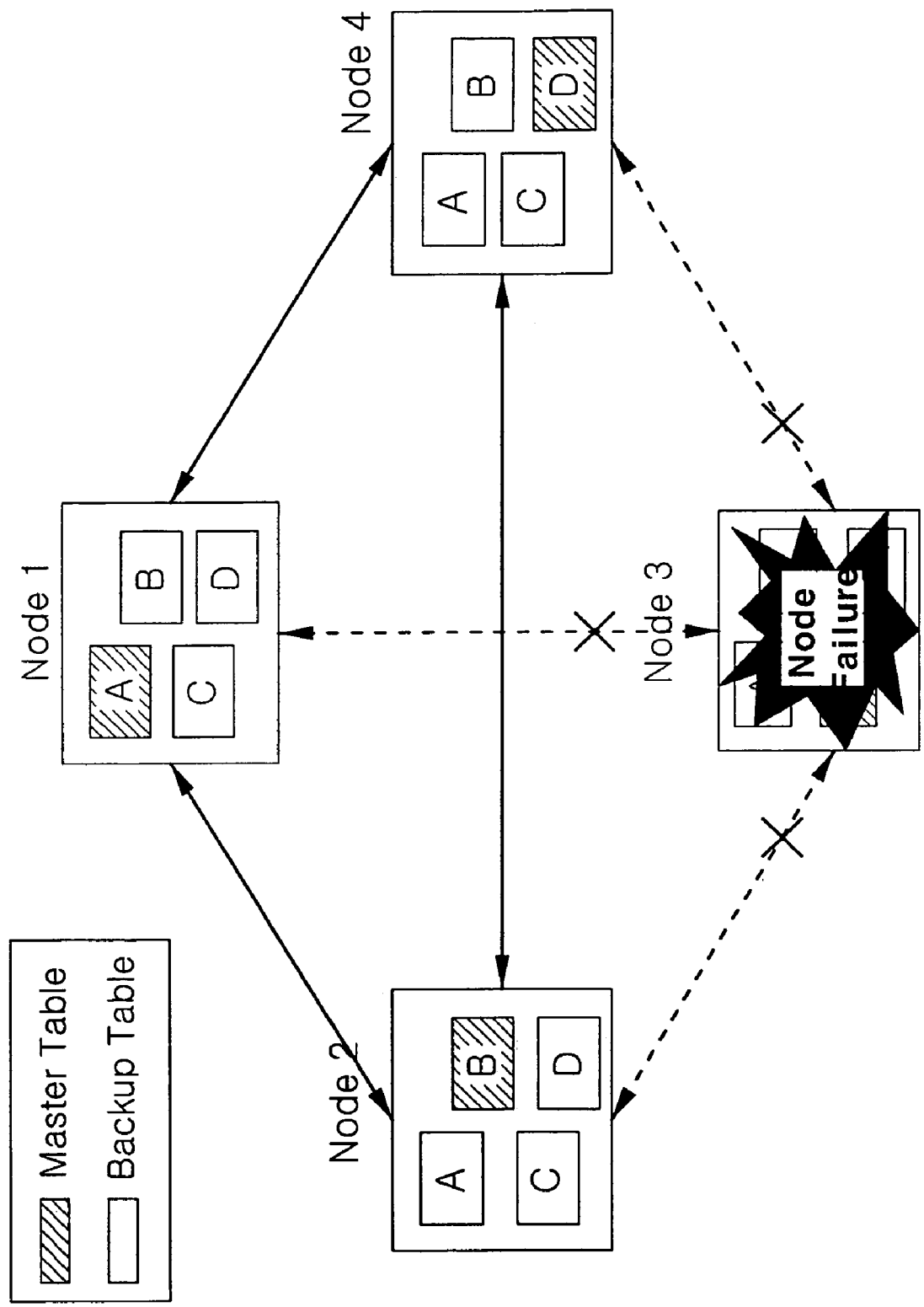
FIGS. 13a and 13b are diagrams showing the occurrence of failure in a node of FIG. 12.
Figure 13B:
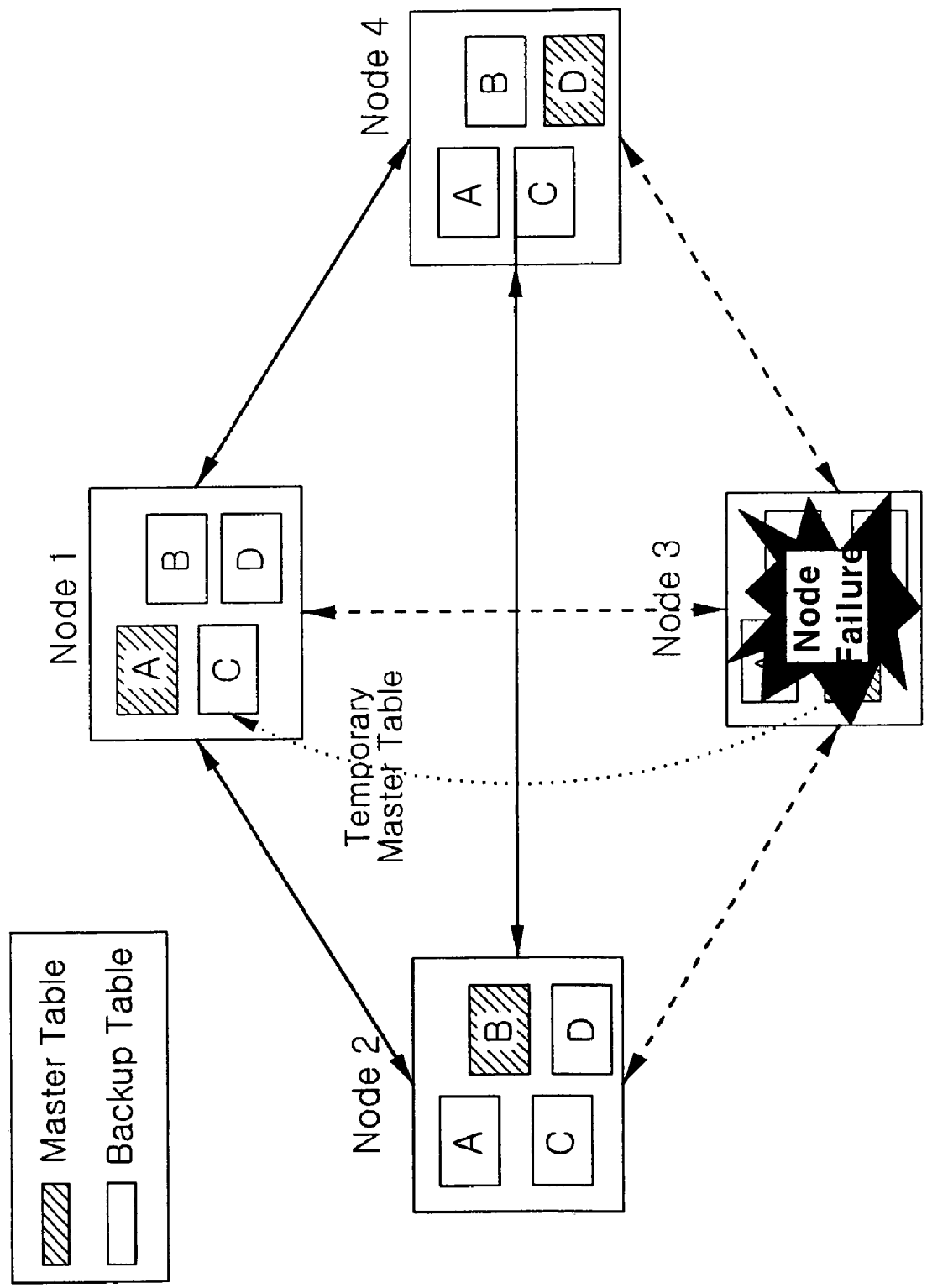

The occurrence of a failure in a node in FIG. 12 is described with reference to FIGS. 13a and 13b.

A shared-nothing spatial database cluster establishes a net-type connection between groups so as to immediately sense the occurrence of a failure in a node. FIGS. 13a and 13b show that, if a failure occurs in a node, the failed node stops the provision of service, but the duplicate node thereof acts as a substitute to provide continuous service. For this operation, a substitute node is determined according to the function of a table existing in the failed node. If a failure occurs in a master node, a corresponding duplicate node detects the number of master tables and allows a node having master tables, the number of which is the lowest, to function as a temporary master on the basis of the detected number of master tables. If a failure occurs in a duplicate node, cluster configuration is not changed, and a recovery procedure for the failed duplicate node is performed.

Further, the recording of cluster logs based on updated records in the recovery procedure of FIG. 12 is described.

If a failure occurs in a node, other nodes in the corresponding group record cluster logs to maintain consistency between the nodes. At this time, each node records independent cluster logs in a master table corresponding to the node. If a failure occurs in the master table, the duplicate table of another node having a duplicate is selected as a temporary master table. Therefore, the temporary master table manages cluster logs until the failed master table performs a recovery procedure and resumes normal service. The cluster logs are based on extendible hashing using record key values in main memory. Further, the cluster logs are configured using the update information of a record and a pointer indicating actual data, that is, an RID or primary key information according to operation.

If a plurality of operations occurs with respect to a single record after a failure occurs in a node, only the latest update information is maintained in the cluster logs using extendible hashing. If an insert operation and an update operation occur, cluster logs are configured on the basis of RID indicating the physical address of data. If a delete operation occurs, cluster logs are configured on the basis of a primary key to identify data. If a plurality of operations occurs before recorded cluster logs are transmitted to the recovery node, a corresponding cluster log is rapidly searched for using extendible hashing, so that only the latest update information remains in the cluster logs (② of FIG. 12).

Next, the recovery of the failed node itself is performed (③ of FIG. 12). The failed node performs recovery thereof using a local log. The local log is recorded when an operation occurs with respect to data included in the node, and uses the same method as the recovery of a conventional single database. If the recovery of the node itself has been completed, the node maintains the consistency of the data thereof, informs other nodes in the group that the node has recovered so as to perform recovery for cluster configuration, and requests cluster logs, maintaining the latest update information, from the other nodes.

Further, the remaining nodes in the group sense that the failed node has recovered, and sequentially access cluster logs, that are stored in respective buckets and that maintain the latest update information, using a connection list. The actual data of the cluster logs are duplicated in the body of packets on the basis of a stored RID or primary key. If the packets are configured, the packets are transmitted to the recovery node (④ of FIG. 12).

Figure 14:
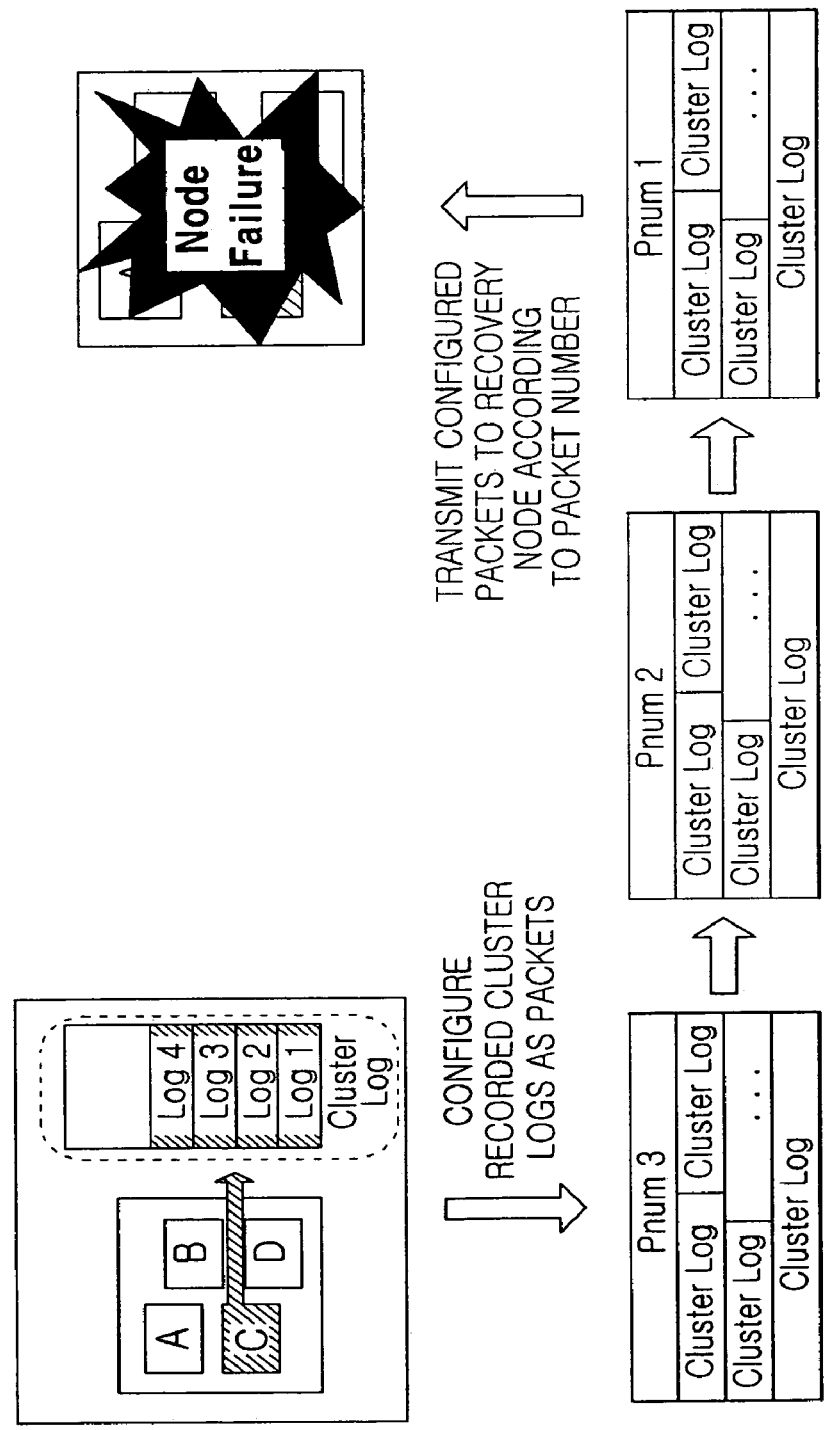
FIG. 14 is a diagram showing the transmission of cluster logs of FIG. 12.

FIG. 14 illustrates the transmission of cluster logs. Respective packets are transmitted in series according to the packet number in headers. If an acknowledgement to the packets, transmitted to the recovery node, has been received, a corresponding cluster log is deleted. On the contrary, if an acknowledgement is not received, the packets are retransmitted. If a transaction occurs during transmission, a corresponding master table processes the transaction and leaves a cluster log. If a cluster log existing in the last bucket has been completely transmitted, it is examined whether a cluster log left during transmission exists. If no cluster log is left, a synchronization procedure is performed.

If a transaction occurs during transmission and cluster logs remain in the master table, it is examined whether the cluster logs are transmittable. If the remaining cluster logs are transmittable, the processing position returns to the first bucket and the cluster logs are transmitted in packets. If the remaining cluster logs are not transmittable, a synchronization procedure is compulsorily performed (⑤ of FIG. 12).

This operation is performed by sensing that logs remain in a bucket after the last cluster log has been transmitted to the recovery node, configuring the logs as a packet and transmitting the packet to the recovery node. At this time, a transaction occurs and cluster logs are left. The last cluster log is transmitted to the recovery node, but the transaction occurs during transmission, so the number of cluster logs is not decreased, but is maintained at a certain number, thus compulsorily performing a synchronization procedure.

Figure 15:
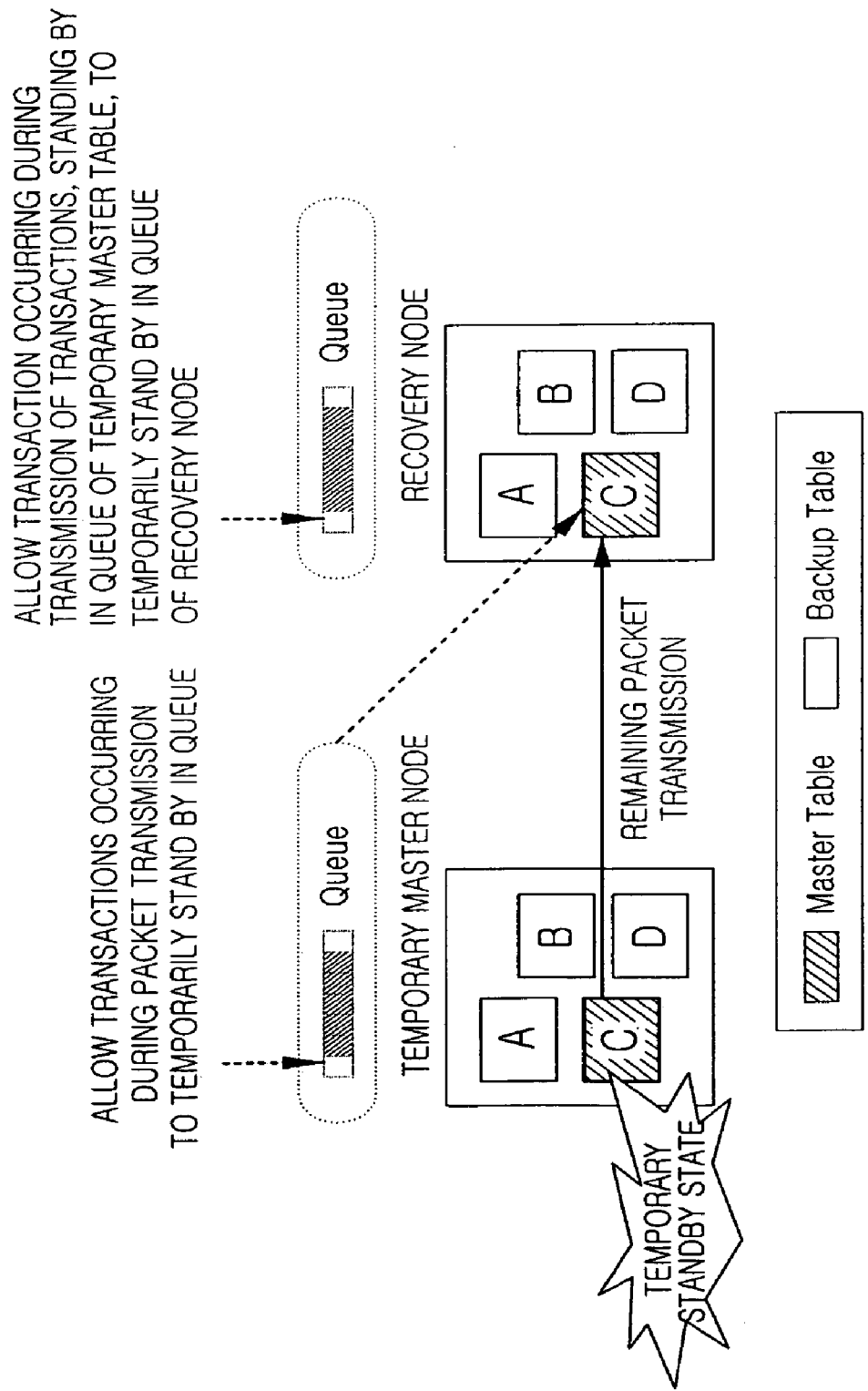
FIG. 15 is a diagram showing the synchronization procedure of FIG. 12.

The synchronization procedure is a process of maintaining the consistency of all transactions occurring during an interval ranging from the point at which the last cluster log packet is transmitted to the point at which the reflection of all cluster logs is terminated. FIG. 15 is a diagram showing the synchronization procedure of FIG. 12.

During the synchronization procedure, the master node is in a temporal transaction standby state, so that all transactions occurring in the standby state temporarily stand by in the queue of the master node. All cluster logs existing in the master node are configured as packets and are transmitted to the recovery node. After all cluster logs are reflected on the recovery node, the master node transmits the transactions, existing in the queue in the transaction standby state, to the recovery node, and maintains the consistency between the recovery node and the other nodes in the group.

If a transaction occurs during the transmission of the transactions, stored in the master node, to the recovery node, the transaction stands by in the queue of the recovery node, and the transaction, standing by in the recovery node, is reflected on the recovery node after all transactions, standing by in the master node, have been reflected on the recovery node. The recovery node reflecting all transactions maintains consistency with other nodes in the group.

After all of the latest cluster logs have been reflected, the table performing the synchronization procedure returns to a state existing prior to the occurrence of a failure.

Figure 16A:
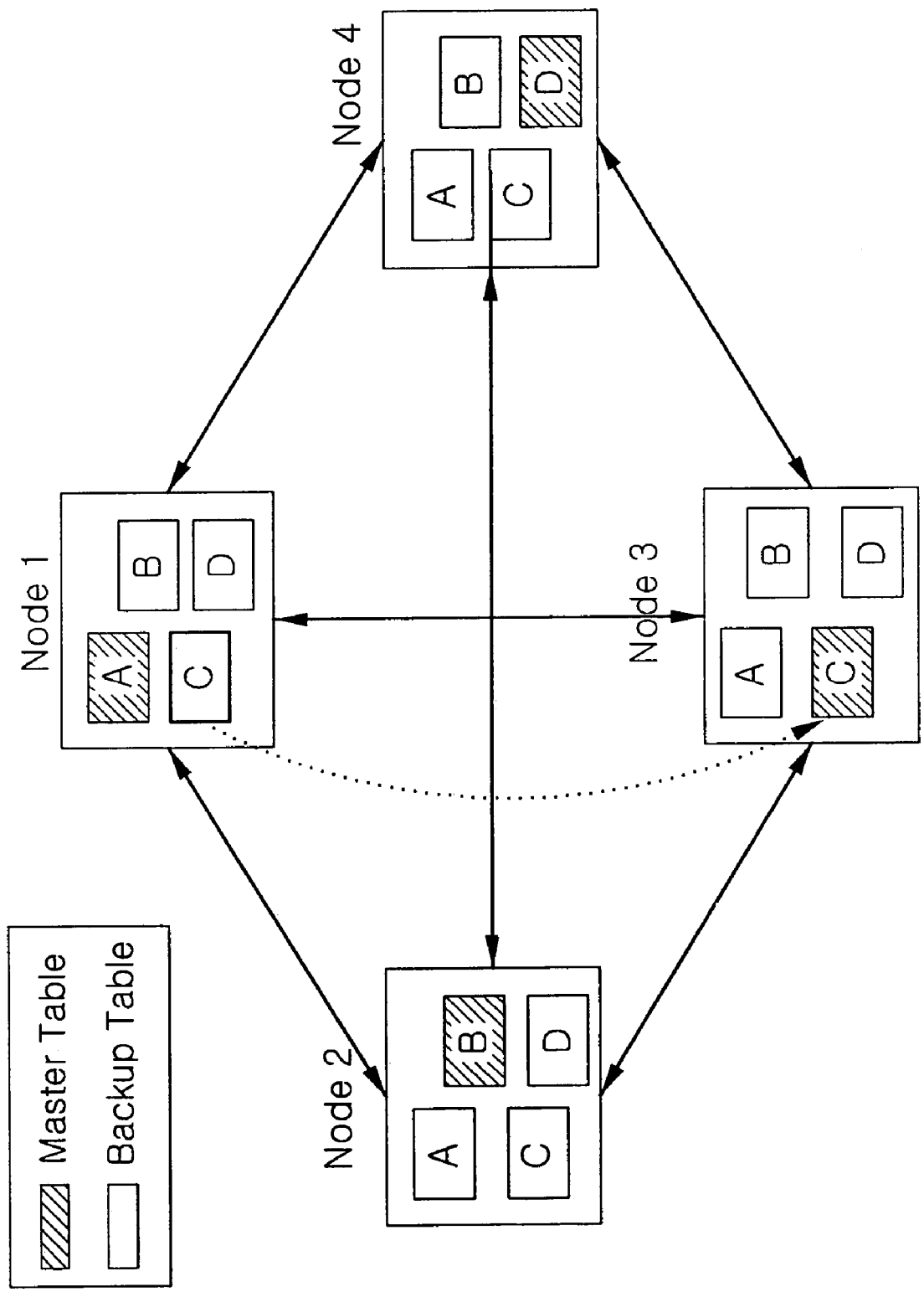
FIGS. 16a and 16b are diagrams showing a change to a state existing prior to the occurrence of a failure to resume normal service in FIG. 12.
Figure 16B:
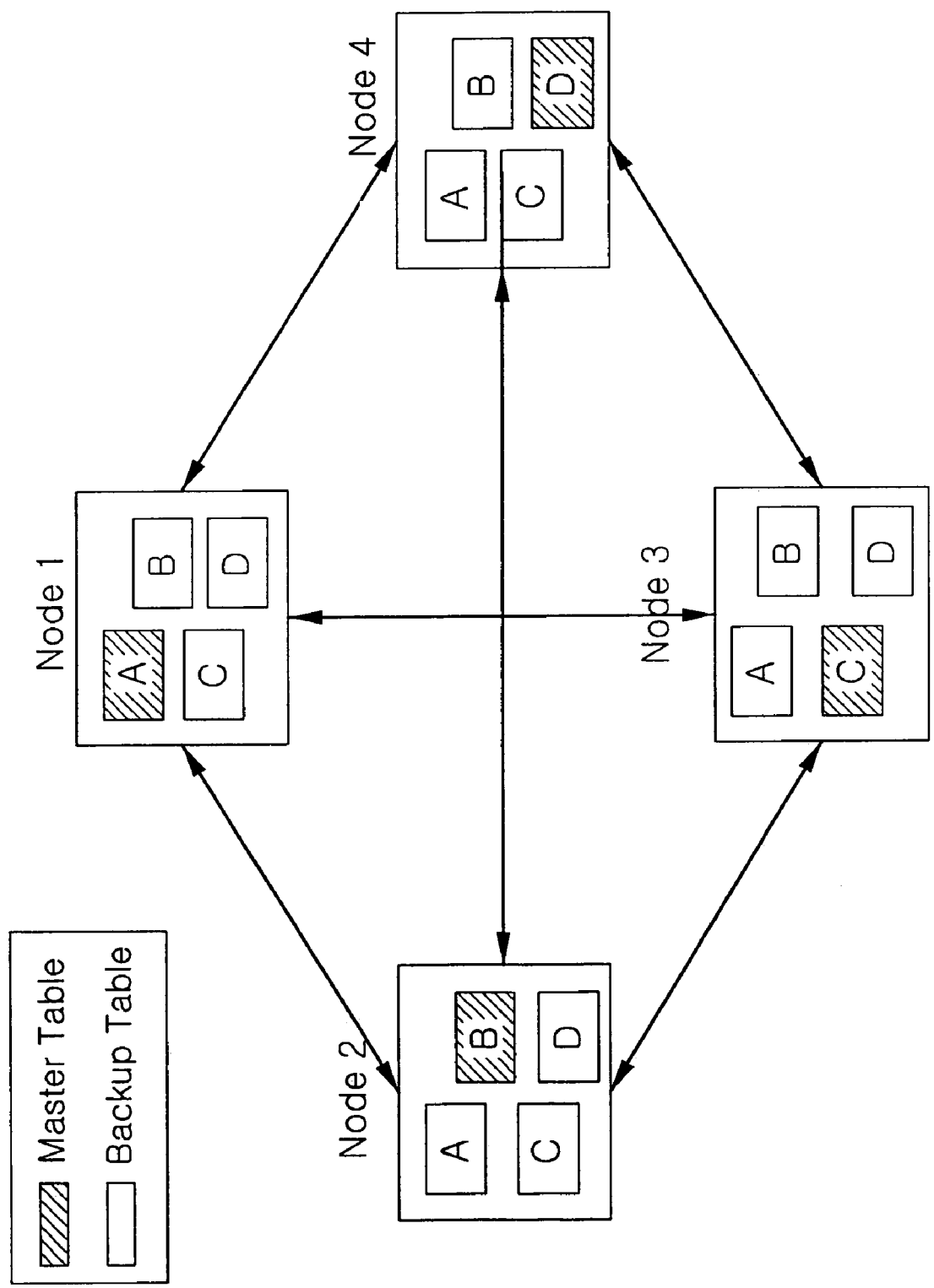

FIG. 16a is a diagram showing a change to a state existing prior to the occurrence of a failure. The change to the configuration of a table existing prior to the occurrence of failure is classified according to the function of tables before the failure occurred. If a failure occurred in the master table, recovery is performed using cluster logs, a synchronization procedure is performed, and then the failed master table resumes normal service for all transactions as a master table (FIG. 16b). If a failure occurred in a duplicate node, recovery is performed using cluster logs, a synchronization procedure is performed, and the duplicate node processes queries transmitted from the master node as a backup node.

As described above, the present invention provides a recovery method using extendible hashing-based cluster logs in a shared-nothing spatial database cluster, which maintains only the update information of a record and RID or primary key as a pointer indicating actual data in main memory and stores the latest update information in cluster logs when a plurality of operations occur with respect to a single record, so that the number of cluster logs decreases, and a transmission load decreases when the cluster logs are transmitted to a recovery node. Further, the present invention is advantageous in that a recovery node need only perform a single update operation with respect to a single record, thus decreasing recovery time.

Further, the present invention is advantageous in that, since it manages cluster logs using main memory-based extendible hashing, the maintenance load for cluster logs decreases, and since a load attributable to a node failure is decreased in a recovery node, recovery time decreases, so that stable service can be continuously provided, thus consequently improving the performance of a shared-nothing spatial database cluster.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A recovery method using extendible hashing-based cluster logs in a shared-nothing spatial database cluster, comprising the steps of:

determining a failure occurs in a predetermined node, a second node in a group, including the predetermined node, recording cluster logs in main memory on a basis of extendible hashing;

determining the predetermined node that has failed recovers itself using a local log, the second node in the group transmitting cluster logs in packets to a recovery node that is the failed predetermined node;

if the recovery node reflects the received cluster logs and maintains consistency with other nodes in the group, the recovery node resuming normal service; and wherein the transmitting of cluster logs comprises the steps of:

initializing packets;

sequentially accessing the cluster logs that maintain a latest update information and are stored in buckets of the main memory, using a connection list, duplicating actual data in the packets on the basis of RID stored in the cluster logs, and then transmitting the cluster logs to the recovery node; and performing synchronization to maintain consistency between nodes if all cluster logs have been transmitted.

2. The recovery method according to claim 1, wherein the cluster logs are configured using update information of a record and Record ID (RID) or primary key information, which is a pointer indicating actual data stored in a database.

3. The recovery method according to claim 2, wherein each cluster log is configured using a flag indicating an occurrence of an insert operation, and RID which is a physical address of actual data stored in the database if an insert operation occurs with respect to the record, configured using a flag indicating an occurrence of an update operation, RID which is a physical address of actual data stored in the database, and a primary key of old data to be updated if an update operation occurs, and configured using a flag indicating an occurrence of a delete operation and a primary key of data to be deleted if a delete operation occurs.

4. The recovery method according to claim 2, wherein the cluster logs are implemented so that, if a plurality of operations occurs with respect to a single record after failure has occurred in the node, only latest update information is maintained in the cluster logs using extendible hashing.

5. The recovery method according to claim 1, wherein the cluster logs are stored in a plurality of buckets implemented in the main memory.

6. The recovery method according to claim 1, wherein the cluster logs, transmitted in packets, have a transmission message format comprising a header and a body, the header including packet numbers corresponding to cluster logs and the body including the cluster logs to be actually transmitted.

7. The recovery method according to claim 6, wherein the body is implemented by sequentially duplicating the cluster logs to be transmitted, a number of which corresponds to a size of the body of a packet.

8. The recovery method according to claim 1, wherein the transmission of the cluster logs to the recovery node is sequentially performed with respect to the cluster logs ranging from a cluster log in a first bucket in the main memory to a cluster log in a last bucket.

9. The recovery method according to claim 8, wherein the transmission of the cluster logs to the recovery node is performed so that, if a transaction occurs during the transmission of the cluster logs and cluster logs remain, a processing position moves to a first bucket and the remaining cluster logs are transmitted to the recovery node after a cluster log in the last bucket has been completely transmitted.

10. The recovery method according to claim 8, wherein the transmission of the cluster logs is performed so that, if a transaction occurs during the transmission of the cluster logs and the number of cluster logs is not decreased, but is maintained at a certain number, a synchronization procedure is compulsorily performed.

11. The recovery method according to claim 10, wherein the synchronization procedure is a procedure of maintaining consistency of transactions occurring during an interval ranging from a point, at which the last cluster log packet is transmitted, to a point, at which reflection of all cluster logs is terminated.

12. The recovery method according to claim 11, wherein the synchronization procedure is performed so that, after a transaction stands by in a queue of a temporary master node, the transaction, standing by in the queue in a standby state, is transmitted to the recovery node, thus maintaining consistency between the recovery node and other nodes in the group.

13. The recovery method according to claim 12, wherein the synchronization procedure is performed so that, if a transaction occurs when the temporary master node transmits the transaction to the recovery node, the transaction stands by in a temporary queue of the recovery node, and is reflected on the recovery node after all transactions standing by in the temporary master node have been reflected on the recovery node.

* * * * *